United States Patent [19]
Steininger et al.

[11] Patent Number: 6,102,473
[45] Date of Patent: Aug. 15, 2000

[54] MOLDING FOR COVERING LONGITUDINAL MEMBER OF AN AUTOMOBILE

[75] Inventors: Gerd Steininger, Boeblingen; Gerhard Bader, Hattenhofen; Manfred Huettner, Lenningen; Bernd Knauer, Esslingen, all of Germany

[73] Assignee: Daimler Benz Aktiengesellschaft and Magna Pebra GmbH, Germany

[21] Appl. No.: 09/070,688

[22] Filed: Apr. 30, 1998

[30] Foreign Application Priority Data

May 2, 1997 [DE] Germany ............................ 197 18 531

[51] Int. Cl.[7] .................................................. B62D 25/20
[52] U.S. Cl. ............................................ 296/209; 296/185
[58] Field of Search .................................. 296/209, 191, 296/185, 901, 189; 293/128

[56] References Cited

U.S. PATENT DOCUMENTS

| | | | |
|---|---|---|---|
| 3,140,891 | 7/1964 | Shreffler | 296/1.1 |
| 3,310,929 | 3/1967 | Garvey | 24/295 |
| 3,897,967 | 8/1975 | Barenyi | 293/120 |
| 4,892,348 | 1/1990 | Nozaki | 296/901 |
| 4,911,495 | 3/1990 | Haga et al. | 296/209 |
| 5,195,793 | 3/1993 | Maki | 293/128 |
| 5,202,172 | 4/1993 | Graf | 293/128 |
| 5,288,530 | 2/1994 | Maki | 293/128 |
| 5,639,522 | 6/1997 | Maki et al. | 293/128 |

*Primary Examiner*—Joseph D. Pape
*Assistant Examiner*—Jason Morrow
*Attorney, Agent, or Firm*—Pendorf & Cutliff

[57] ABSTRACT

The invention concerns a cover (10) for a longitudinal member of a automobile, with a longitudinally extending covering part (16) which is securely attachable with the body (14) of the automobile and in the assembled condition covers the longitudinal member at least from the side exposed to view, of which the end segments (28, 30) with their upper edge (36, 38) engage the front and rear fender of the body with formation of a joint. For simplification of the manufacture and assembly as well as for improvement of the form integration a joint gap covering joint gap shield (42, 44) is provided on the respective end segments (28, 30), which is capable of being pre-assembled via connecting elements (46, 48), wherein the end segments together with the pre-assembled joint gap shield are attachable to the automobile body at associated connecting positions by means of the connecting elements.

19 Claims, 3 Drawing Sheets

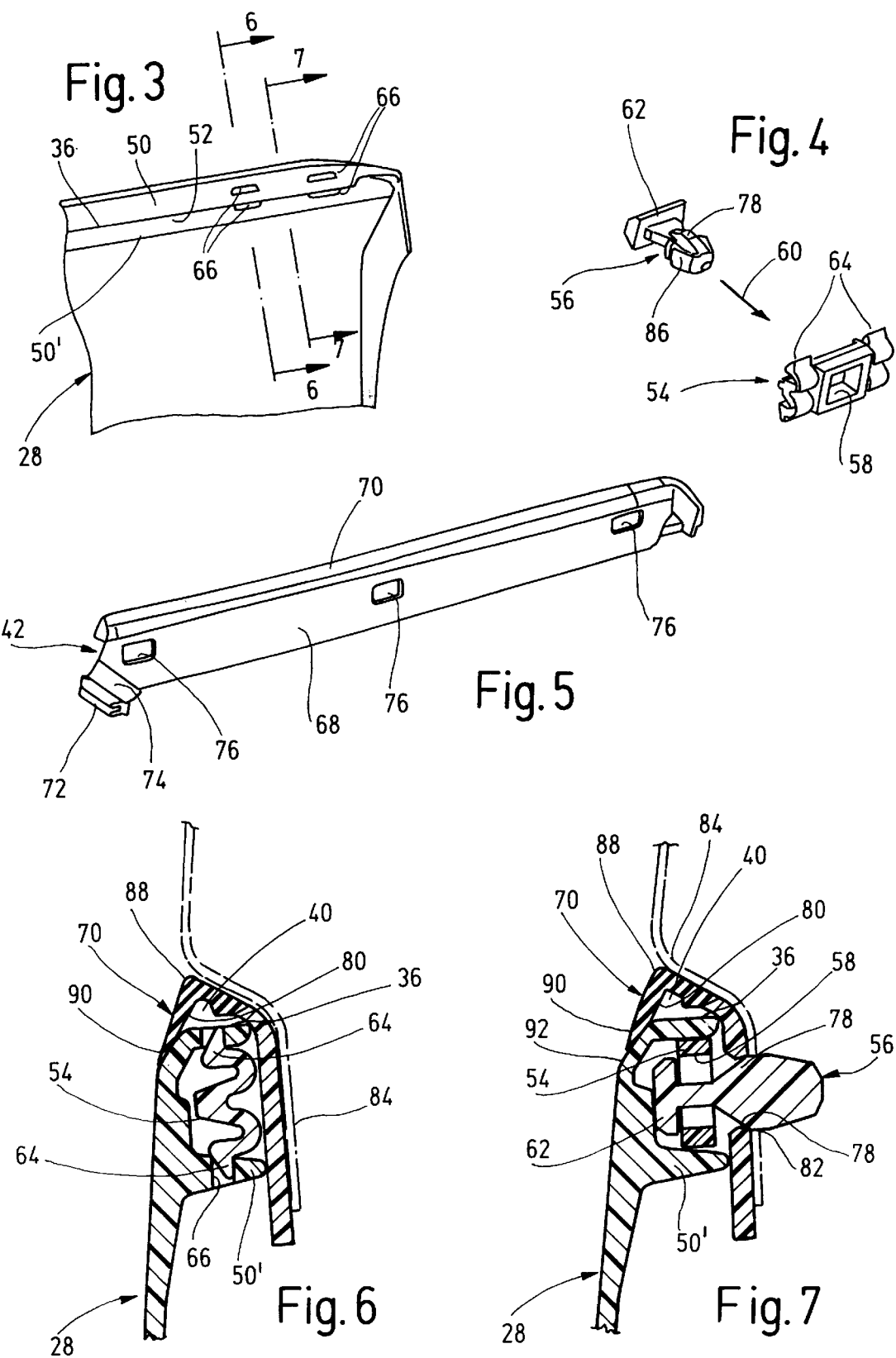

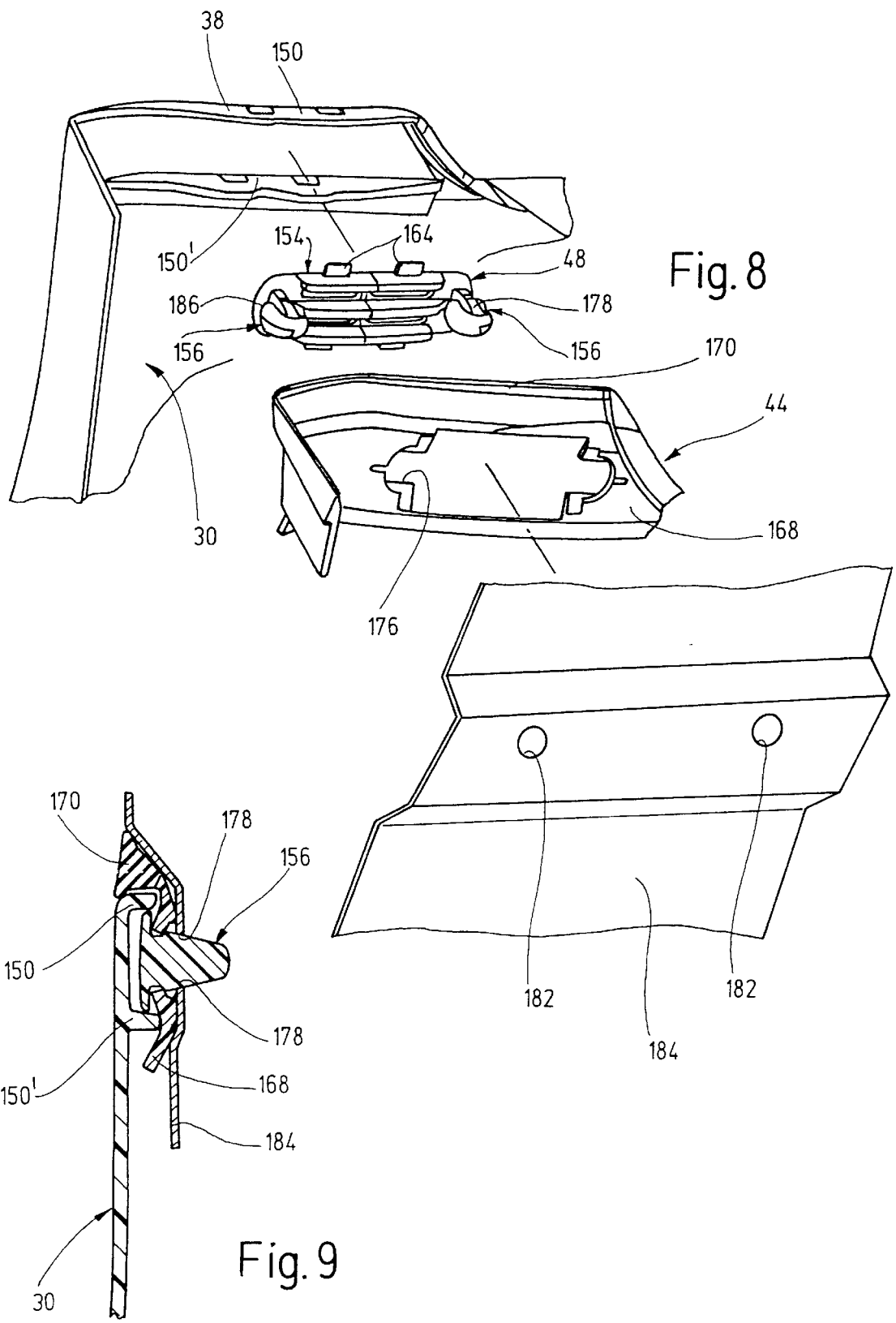

MOLDING FOR COVERING LONGITUDINAL MEMBER OF AN AUTOMOBILE

BACKGROUND OF THE INVENTION

1. Field of the Invention

The invention is in the field of moldings for covering a longitudinal member of an automobile front fender to rear fender, such as a rocker panel or sill below the automobile doors, the molding including a molding panel substantially conforming with the automobile body and including a panel front end segment engaging the automobile front fender and a panel rear segment engaging the automobile rear fender. More specifically, the invention addresses the problem of joint gaps formed between the molding panel and the automobile body at the panel front upper edge and rear upper edge.

2. Description of the Related Art

In automobile molding panels of this type, which respectively serve to cover one of the longitudinal members or beams extending along the side of the automobile between the edges of the fender openings, the attachment to the body occurs at a number of fastening points, of which the positions are determined by bore holes and other connecting elements. Due to allowed variations within tolerances occurring during the manufacturing of parts and directional variations introduced during assembly, joint gaps are formed when attaching the molding, which are disturbingly visible over the length of the molding and particularly at the end sections. Since as a rule the sheet metal of the rear fender is rigidly welded to the longitudinal member or as the case may be door frame or sill, a separation gap comes to exist above all in the joining area between the lower area of the front fender which is not fixed to any door frame and the upper edge of the attached molding. The allowable variation or field of tolerance extends here primarily in the vertical and transverse directions of the automobile. In order to prevent a non-aerodynamic or warped attachment, the known longitudinal moldings are frequently produced in multiple pieces, wherein separate end sections separated along the door edge are fastened in a time consuming and expensive manner. The covering over of the separation gaps is accomplished using separate trim strips or ornamental moldings, which are mounted on their own pre-formed fastening points and of which the edges project over the fenders and the cover part. The principle disadvantage associated with this approach, aside from the lack of form integration, is in the increased manufacture and assembly costs.

SUMMARY OF THE INVENTION

Beginning herewith, the invention is concerned with the task of providing a molding for covering a longitudinal member, which can be mounted on the outer surface of the automobile in a simple manner to provide the greatest possible surface smoothness.

For solving the above mentioned task it is proposed in accordance with the invention that on the respective end sections of the molding panel a joint gap shield designed for covering the joint gap is pre-mountable via connecting elements, and that the end segments together with the pre-mounted joint gap shields can be attached to the automobile body via connecting elements at associated connecting points. As a result of the pre-assembly, the joint gap shields are connected with the cover part for storage and transport purposes so they cannot be lost. Since the therefore necessary connecting elements also are of use in the final assembly, the construction elements can be secured in the pre-determined position with minimal manual manipulation.

Preferably, the connecting elements comprise a base part, which can be anchored to the body-facing back side of the end segments, so that also the connecting position remains covered from view.

In a constructionally advantageous embodiment there is provided on the back side of the end segment two spaced-apart ribs running parallel to each other along the upper edge, forming a receiving channel for bordering the base part, wherein the base parts are provided with sideways projecting engagement tongues which engage into engagement openings of the mounting or assembly rib. Herein the upper surface of the end section bent towards the back side of the cover part can form one of the mounting ribs.

In order to make possible a multiple connecting function of the connecting elements, these can exhibit multiple independent plug parts designed to be inserted through openings of the joint gap shield and engageable in openings in the automobile body.

According to a particularly preferred embodiment of the invention the connecting elements are, at least in the front end section of the cover part, mounted to be slideable in a limited manner. Therewith it is possible to adjust for tolerances between the respective mounting relationships of the connecting points between the cover part and the automobile body. A slide or displacement possibility in particular in the longitudinal direction of the automobile is made possible thereby, that the base parts are guided through the assembly rib-bordered receiving channel, wherein the detent or latch tongue with sideways movement engages or latches in the longitudinal elongate holes of the mounting ribs. In order to also make possible the adjusting for tolerances in particular in the automobile vertical direction, the mounting plugs of the displaceable connecting element are mounted or guided on the base element so as to be displaceabe preferably at a right angle to the direction of displacement.

According to a further preferred embodiment of the invention the joint gap shield is, by means of the displaceable connecting element, moveable with respect to the upper surface of the end segment. Thereby the joint gap shield allows itself to be aligned or positioned in suitable manner for an optimal form integration with respect to the cover part.

In this regard it is a further advantage, when the joint gap shield forms a downwardly directed open receptacle or receiving pocket, into which the upper edge of the end segment extends, so that the cover functionality remains intact even after alignment or adjustment of the construction elements with respect to each other.

In order to make possible a backside mounting and a visible side covering at the cover part, the joint gap shield can comprise an, to the back side of the end segment securable, flange strip and an, the upper edge of the end section overlapping, the joint gap covering cover strip.

Advantageously the cover strip exhibits a from the visible side towards downwards projecting flexible edge lip, which on one to the back side of the end segment bent or beveled visible side contact surface in the area of the upper edge of the end segment elastically lies against. Therewith there is achieved in the various displacement positions of the cover strip continuously a surface flat or conforming connection to the end segment. A further improvement in this respect can be achieved when the cover strip exhibits an acute upper angle and in the assembled condition lies with a resilient wall area against the fender.

In order to be able to align or orient the connecting elements in the longitudinal direction of the flange strip independent of the assembled position thereof, the flange strip exhibits holes, in which the plug parts of the connecting element are guided in the sliding or displacement direction of the base part. Therein it is advantageous, when the flange strip lies upon the free rim edge of the mounting rib with coverage of the receiving channel, wherein the plug parts of the connecting elements engage behind the longitudinal edges of the longitudinal holes with latches.

An advantageous embodiment with regard to the constructional technology takes into consideration, that the cover strip is comprised of an elastomeric material, while the flange strip is formed of a bend-resistant plastic, wherein the cover strip and the flange strip are connected with each other unitarily as a two-component injection dye molded part.

It is further of advantage, when the cover piece is formed as a one-piece injection dye molded part of plastic, in particular of polyurethane. Therewith a simplification of the production and assembly is made possible as well also as an optically appealing form construction with advantageous aerodynamic characteristics.

BRIEF DESCRIPTION OF THE DRAWINGS

In the following the invention will be described in greater detail by reference to the illustrative embodiments shown in schematic form in the drawings. There is shown:

FIG. 3 a front end segment of a cover part of the longitudinal member cover according to FIG. 2 in a perspective back side view;

FIG. 4 a connecting element of the longitudinal body cover according to FIG. 2 in a perspective view;

FIG. 5 a joint gap shield mountable on the front end section of the cover part in an enlarged view corresponding to FIG. 2;

FIGS. 6 and 7 a sectional view of a vertical section of the mounted cover for the longitudinal body in the plane of the section lines 6—6 and 7—7 of FIG. 3;

FIG. 8 a perspective exploded representation of a back end section of the cover for a longitudinal body and FIG. 9 a sectional view of a vertical section of the mounted cover for the longitudinal body in the area of the back end section.

DETAILED DESCRIPTION OF THE INVENTION

Figure 1:
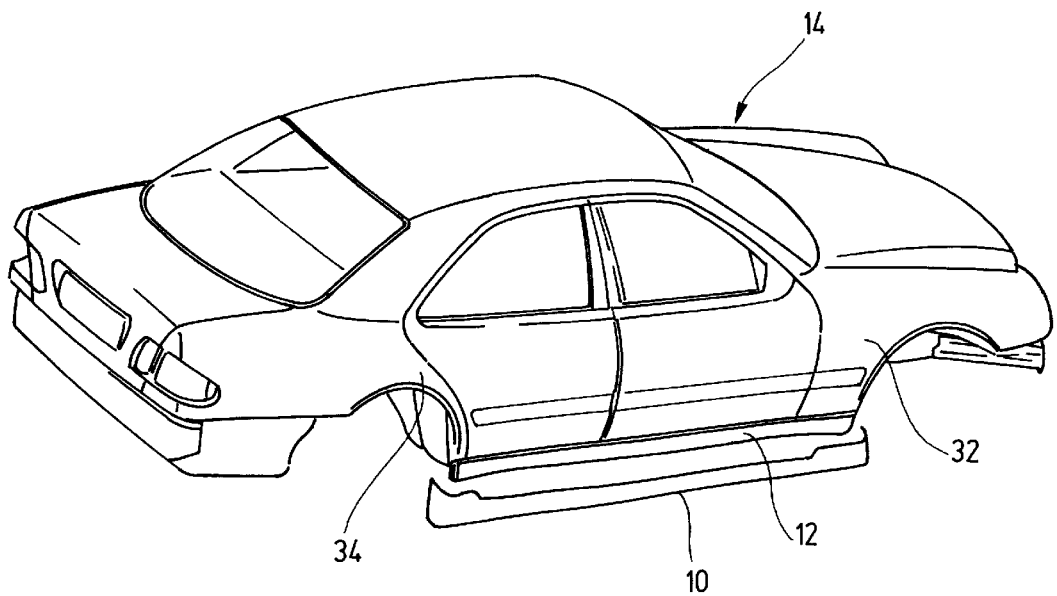
FIG. 1 the body of an automobile with a cover for a longitudinal member in a perspective view.
Figure 2:
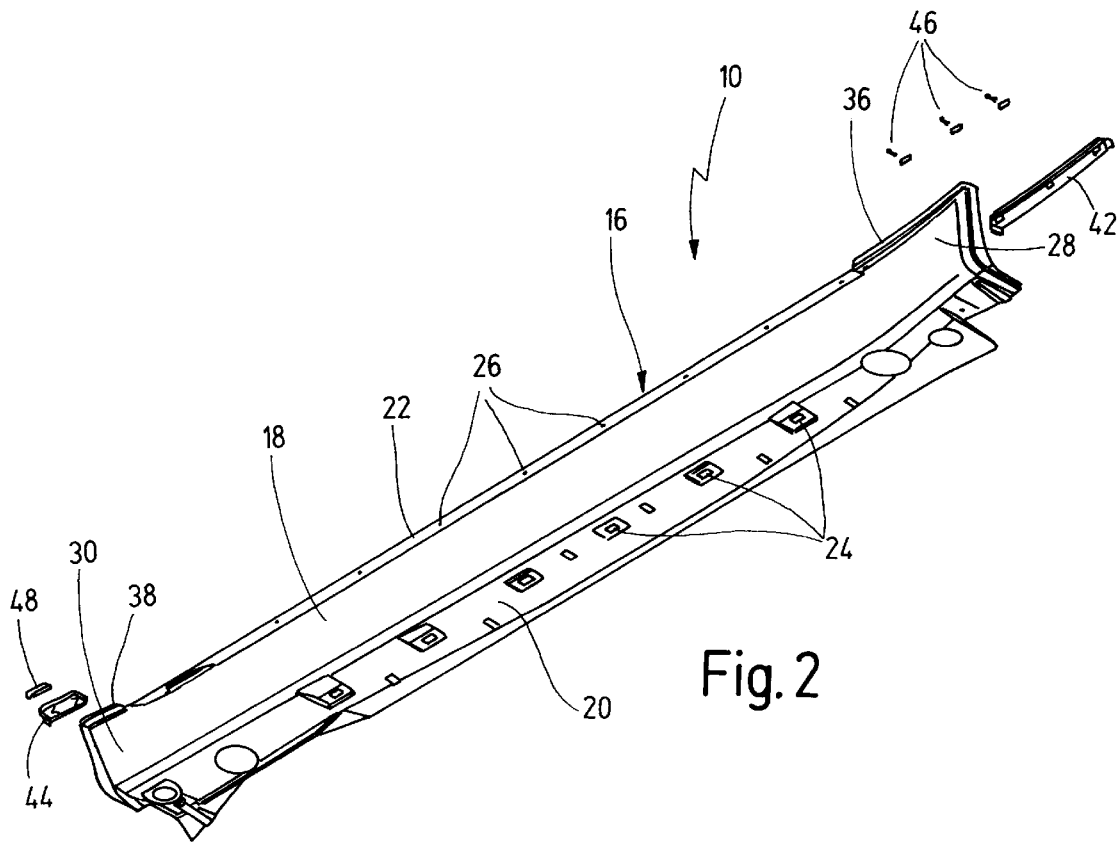
FIG. 2 a exploded representation of a cover for a longitudinal body intended for the right longitudinal body.

The longitudinal molding 10 shown in the figure can be secured as a construction component on an automobile so that it covers a longitudinal member 12 extending between the automobile axles, such as the rocker panel or sill below the automobile doors, and presents the appearance of being an integral construction component of the body 14. The longitudinal molding includes a thin-walled molding panel 16 formed as a single piece of plastic, and including lower and upper horizontal walls 20, 22 that can be securely fixed in a simple manner to the automobile floor or, as the case may be, the longitudinal member 12, along a multiplicity of securing points 24, 26 via not shown clip connections, such that the side wall 18 of the longitudinal molding covers from view the longitudinal member 12 over its entire length from front to rear wheel well. The molding panel, when mounted, has an inside surface facing the automobile, and an outside surface exposed to view, and a longitudinal axis.

In the mounted condition the longitudinal cover 16 engages, with its front end segment 28 and rear end segment 30, the bottom area of the front and rear fenders 32, 34, respectively, between the door and wheel well. Joint gap shields 42, 44 are provided for covering the gap 40 formed between the upper edges 36, 38 of the end segments 28, 30 and the fender wall, which joint gap shields are pre-mounted on the end segments 28, 30 via connecting elements 46, 48.

In order to mount the front end segment 28 of the molding (the inside surface of which is shown sectionally in FIG. 3) onto the automobile body via connecting elements 46, two spaced-apart mounting ribs 50, 50' are provided parallel to each other and projecting out from the mounting panel inside surface, wherein the upper mounting rib 50' is formed by the horizontally bent upper edge 36 of molding panel 10. The mounting ribs 50, 50' define a receiving channel 52, in which three connecting elements 46 can be engaged spaced apart from each other.

The connecting elements 46 shown in FIG. 4 are comprised of a base part 54 and an independent plug part 56. The base part 54, which has a rectangular periphery, exhibits a through-hole 58, through which the arresting plug 56 can be inserted in the direction of the arrow 60, until a flange plate 62 of the plug part 56 abuts against the facing edge of the encompassing through-hole 58. The narrower cross-section of the plug part 56 makes possible a displacement movement within the through-hole 58 of the flange plate 62 transverse to the longitudinal axis and along the plane of the base part 54. The connecting elements 46, which are assembled in this manner upon the molding panel, are anchored using elastic tongues 64 which project beyond the longitudinal edges of the base part 54, and which engage with sideways play in associated elongate holes 66 of the assembly ribs 50, 50'. In this manner the plug parts 56, together with the base part 54, are guided to be longitudinally slideable in the receiving channel 52 and at the same time are adjustable in height perpendicularly thereto in the plane of the through-hole 58.

The joint gap shield 42 provided for the front end segment 28 of the flange strip, as shown in FIG. 5, is comprised of a stiff bend-resistant plastic strip, referred to as flange strip 68, on the upper longitudinal edge of which an elasotmeric cover strip 70 comprised of an elastomer is formed as a unitary part by a two-component injection molding process. In the end of the flange strip 68 closest to the door there is formed a perpendicularly elongate detent piece 72 with a U-shaped cross-sectional profile, which is insertable on the automobile body panel in the entry-way area, and which further includes an upwardly slanted or canted edge lip 74 which lies against a surface perpendicular to the fender main plane. The flange strip 68 exhibits longitudinal elongate holes 76, via which it can be pre-mounted upon plug parts 56 extending out from the receiving channel 52. In the pre-mounted condition the flange strip 68 lies against the edges or rims of the mounting ribs 50, 50', wherein elastic clips 78 of the plug parts 56 engage behind the inner (body facing) edges of the elongate holes 76. Thereby it is possible to slide the plug parts 56 with respect to the joint gap shield 42 inside the long holes 76 in the longitudinal direction of the cover part 16, thus maintaining the possibility to orient the joint gap shield 42 with respect to the upper edge 36 of the end segment 28 vertically to the automobile as a result of the play in the plug part 56 within the through-hole 58. Thereby it is also possible to clip the joint gap shield or molding 42 to the upper edge 36 of the end segment 28, wherein the detente piece 72 forms a pivot axis fixed in relation to the body. Following the above described pre-assembly of the joint molding 42, the cover strip 70 overlaps over the upper edge 36 of the end segment 28, thereby forming a receptacle pocket 80 open downwards towards the upper edge.

The joint gap shield 44 for the rear end segment 38 of the cover part 16 shown in FIG. 8 differs from the front joint gap shield 42 essentially only therein that in the pre-mounted condition, together with the connecting element 48, it is fixed against displacement on the cover part 16. The otherwise functionally identical construction elements are shown in FIGS. 8 and 9 with reference numbers increased by 100. Furthermore, with respect to the rear joint gap shield 44, flange strip 168 is secured on the inner side of the rear end segment 30 by connecting element 48 which is in turn secured to the automobile body via two elastic clips 156, and which are secured to mounting ribs 150 by latch tongues 164, 150', such that the cover strip 170 overlaps the upper edge 38 of molding panel 10.

For final assembly, the molding panel 16 is adapted to be securely mounted on the automobile body 14 or, as the case may be, the longitudinal member 12, without resort to tools, by the simple engagement of the clip connections into the connecting positions 24, 26. Since the rear fender 34 is continuously welded with the longitudinal member 12, it is also possible to engage the rearmost projecting plug part 156 of the connecting element 48 against automobile wall contact surface 184 in the associated detent opening 182 of provided wall position of the rear fender 34 without problem. As attachment members there are provided elastic clips or latch tongues 186 which engage behind the edges of the openings 182 of the rear joint gap shield 44, of which the engagement points are offset with respect to the engagement points of the elastic clips 178 towards the free end of the plug part 156 for engagement on the automobile body 14 or longitudinal member 12, so that the molding panel end segment 30 is held against the automobile fender sheet metal 184 largely without play.

On the front fender, dimensional variations produced during manufacturing of the body lead thereto, that the mounting openings 82 provided in the lower wall part 84 of the front fender 32 for the engagement of the plug part 56 (FIG. 7) lie in a wide field of variation relative to the front end segment 28. For this reason, the plug parts 56 allow themselves, via the above described displaceability, to be positioned in the longitudinal and height direction of the automobile, or as the case may be, the orientation appropriate to the molding panel 16, so that in certain cases with a small twist or warp of the end segment 28 they can be inserted into the openings 82, whereby the latch tongues 86 engage behind the edges of the openings. As a result of the plug part being connected with the joint gap shield 42 free of play in the vertical direction, it is accomplished that an acute angled upper border edge 88 of the shield part 70 lies continuously in defined relationship against a concave contact surface 84 the fender 32 and therewith provides a substantially smooth surface transition. Finally, the necessary tolerance correction leads thereto that the front end segment 28 with its upper edge 36 more or less deeply engages in a receptacle pocket in the joint gap shield wherein, viewed in cross-section, a lip 90 downwardly overlaps over the top of the molding panel and elastically lies against a beveled or canted contact surface 92 of the front end segment 28 of the molding panel, to ensure a smooth transition covering the joint 40 in an optically not noticeable manner.

In summary the following is to be concluded: The invention concerns a cover 10 for a longitudinal member of aN automobile, with a longitudinally extending molding panel 16 designed to be securely attached to the body 14 of the automobile and which, in the assembled condition, covers the longitudinal member from view. The end segments 28, 30 engage the front and rear fender of the body such that their upper edges 36, 38 respectively form a joint gap. For simplification of the manufacture and assembly, as well as for improvement of the integration into the form of the body, joint gap shield 42, 44 is provided on the respective end segments 28, 30, covering the joint gap. The joint gap shield is capable of being pre-assembled onto the molding panel 16 via connecting elements 46, 48. The end segments of the molding panel, together with the pre-assembled joint gap shields, can be attached to the automobile body at associated connecting positions using the connecting elements.

What is claimed is:

1. Molding (10) for covering a longitudinal sill of an automobile body from front fender to rear fender, said molding comprising:

a molding panel (16) dimensioned for substantially conforming with an automobile body (14), including a panel front end segment (28) for engaging said automobile front fender (32), a panel rear segment (30) for engaging said automobile rear fender (34), a panel front upper edge (36) spaced from said automobile body to form a joint gap (40) when said molding panel is mounted on said automobile body, and a panel rear upper edge (38) spaced from said automobile body to form a joint gap (40) when said molding panel is mounted on said automobile body, and front and rear joint gap shields (42, 44) pre-mounted on said molding panel end segments (28, 30) via connecting elements (46, 48) and adapted for covering over said joint gap (40), wherein said end segments (28, 30) together with said pre-mounted joint gap shields (42, 44) can be attached to pre-determined connecting points (82, 182) of said automobile body (14) via said connecting elements (46, 48).

2. Molding as in claim 1, wherein said molding end segments (28, 30) have receptacles on the side facing the automobile body (14) for receiving said connecting elements (46, 48), and wherein said connecting elements (46, 48) respectively include a base part (54, 154) designed for mating engagement with said receptacles.

3. Molding as in claim 1, wherein upper and lower mounting ribs (50, 50') extend along the upper edge (36) of the front end segment (28) of said molding panel on the side facing said automobile body, wherein upper and lower mounting ribs (150, 150') extend along the upper edge (38) of the rear end segment (30) of said molding panel on the side facing said automobile body, wherein said mounting ribs are spaced apart and parallel to each other and define a receptacle channel (52), and wherein engagement openings (66, 166) are defined in said mounting ribs, and wherein said connecting elements (46, 48) respectively include a base part (54, 154) in mating engagement within said receptacle channel, each of said base parts (54, 154) including detent pawls (64, 164) engaged in said engagement openings (66, 166) defined in said mounting ribs.

4. Molding as in claim 3, wherein said upper edges (36, 38) of said end segments (28, 30) of said molding panel are bent to form respectively said upper mounting ribs.

5. Molding as in claim 1, wherein said joint gap shield (42, 44) is provided with apertures (76, 176), wherein said automobile body is provided with mounting holes (82, 182), and wherein said connecting elements (46) include plugs (56, 156), each plug designed for insertion through one of said joint gap shield apertures (76) and one of said automobile body mounting holes, said plug including a pawl (78, 178) for engagement with said joint gap shield (42, 44) and a separate pawl (86, 186) for engagement with said automobile body.

6. Molding as in claim 1, wherein at least said connecting element (46) mounted on the front end segment (28) of the molding part (16) is limitedly slideable in said receptacle between forward and rearward end positions defined by said receptacle.

7. Molding as in claim 3, wherein said connecting element (46) includes a base part (54) and a plug part (56), said base part including elastic tongues (64), said connecting element being slidably guided in a receptacle channel (52) define by longitudinally extending mounting ribs (50, 50'), said mounting ribs including longitudinally extending elongate holes (66), wherein said elastic tongues (64) engage with longitudinal play in attachment openings formed by said elongate holes (66) in said mounting ribs (50, 50').

8. Molding as in claim 7, wherein said plug parts (56) of said displaceable connecting elements (46) are slideably guided on their associated base part (54) transversely to said longitudinal axis.

9. Molding as in claim 5, wherein the joint gap shield (42) is moveable with respect to said upper edge (36) of said front end segment (28) via said displaceable connecting element (46).

10. Molding as in claim 1, wherein said front joint gap shield (42) forms a downwardly open receptacle pocket (80) into which the upper edge (36) of said front end segment (28) extends.

11. Molding as in claim 1, wherein said joint gap shield (42, 44) includes a flange strip (68, 168) designed to fit flush against said automobile body and a shield part (70, 170) which overlaps over the upper edge (36, 38) of the end segment (28, 30) and forms a cover over the joint gap (40).

12. Molding as in claim 11, wherein the shield part (70) includes a downwardly directed flexible lip (90), wherein said upper edge (36) of said end segment (28) of said molding panel (16) includes a curved or beveled contact surface (92), and wherein said flexible lip (90) lies elastically against said contact surface (92).

13. Molding as in claim 11, wherein said shield part (70) includes an acutely angled upper edge (88), and wherein said joint gap shield (42) is designed for form-fitting engagement against a concave surface (84) of said automobile front fender (32).

14. Molding as in claim 11, wherein said joint gap shield flange strip (68) includes elongated holes (76) through which the plug parts (56) of the connecting element (46) are guided in the direction of displacement of the base part (54).

15. Molding as in claim 14, wherein the flange strip (68) lies against ridges of the upper and lower mounting ribs (50, 50'), thereby covering over the receptacle channel (52), wherein pawls (78) of the plug parts (56) of the connecting elements (46) engage longitudinal edges of the elongate hole (76).

16. Molding as in claim 11, wherein the shield part (70, 170) of said joint gap shield is comprised of an elastomeric material, wherein said flange strip (68, 168) of said joint gap shield is formed of a bend-resistant plastic, and wherein said shield part and flange strip are unitarily joined to each other.

17. Molding as in claim 16, wherein said joining is the result of co-injection molding.

18. Molding as in claim 1, wherein said molding panel (16) is formed by injection molding as a single piece of plastic.

19. Molding as in claim 18, wherein said plastic is polyurethane.

* * * * *